United States Patent [19]
Grebe et al.

[11] 3,975,186
[45] Aug. 17, 1976

[54] METHOD OF MAKING IRON POWDER

[75] Inventors: Klaus Grebe, Kettwig; Hans de Haas, Meerbusch; Norbert Dautzenberg, Wegberg-Beeck; Josef Hewing, Monchen-Gladbach, all of Germany

[73] Assignee: Mannesmann Aktiengesellschaft, Dusseldorf, Germany

[22] Filed: Sept. 10, 1975

[21] Appl. No.: 611,858

[30] Foreign Application Priority Data
Sept. 12, 1974 Germany............................ 2443978

[52] U.S. Cl............................... 75/.5 AA; 75/.5 BA
[51] Int. Cl.².................... B22F 9/00; C21B 15/00
[58] Field of Search...................... 75/.5 AA, .5 BA; 210/45, 47

[56] References Cited
UNITED STATES PATENTS

| | | | |
|---|---|---|---|
| 2,065,618 | 12/1936 | Sherwood | 75/.5 BA |
| 2,735,757 | 2/1956 | Zapf | 75/.5 AA |
| 2,818,328 | 12/1957 | Francis | 75/.5 BA |
| 2,867,524 | 1/1959 | Chang | 75/.5 AA |
| 2,927,016 | 3/1960 | Francis | 75/.5 AA |
| 3,044,868 | 7/1962 | Francis | 75/.5 AA |

*Primary Examiner*—W. Stallard
*Attorney, Agent, or Firm*—Ralf H. Siegemund

[57] ABSTRACT

Iron oxide particles are made by spray calcination and the oxide is reduced at least substantially in CO at temperatures between 800° and 1000° C. The oxide is heat-treated prior to calcination or CaO is added to enhance formation of iron fibers. The reducing atmosphere may in parts include hydrogen or the last phase of reduction is carried out in hydrogen. The iron cake is cooled and broken up in a grinder. The resulting powder has low bulk density due to a fiber-like, non-porous consistency of its particles. Grinding may continue to increase bulk density.

17 Claims, No Drawings

METHOD OF MAKING IRON POWDER

BACKGROUND OF THE INVENTION

The present invention relates to the making of iron powder particularly of the variety which has fibrous configuration, structure and texture.

The art and technique of making sintered parts requires usually iron powder with a bulk density from 2.3 to 3.5 grams per cubic centimeter. Aside therefrom, powder having a much lower bulk density is of interest in other fields, such as the manufacture of friction and brake linings. Specifically, such linings have a metal, skeleton-like body with many pores for embedding adequate quantities of another material, e.g. graphite or plastic. The skeleton is made of medium light weight powder having bulk density of about 1.4 to 1.5 g/cm$^3$.

Such medium light weight iron powder is made in accordance with a known method as follows. Very pure magnetic iron ore concentrate is reduced to sponge iron in a muffle or retort furnace at a temperature of 700°C whereby the furnace is additionally charged with coke fines and a solid desulfurizing agent. Iron sponge from the residue is ground to iron powder. This method is, for example, described in "Etude bibliographique des procedes de reduction direct des minerais de fer", 3rd edition, B/2, Communaute europeenne du charbon et de l'acier haute autorite, Luxembourg May 1967.

The "Journal Iron and Steel Inst.", London, 1956 pages 90 to 96, describes a method of making still lighter iron powder. Iron oxide (Fe$_2$O$_3$) is reduced to sponge iron in a pure hydrogen atmosphere at temperatures from 760° to 980°C. The iron sponge is then broken into particles by means of wire brushes to obtain a powder having grain size from 53 to 74 $\mu$. Subsequently, the powder is heated in hydrogen to a temperature within the narrow range from 704° to 717° C in order to reduce any residual oxide. The bulk density of that powder is reported to be 0.79 g/cm$^3$.

Investigations and tests have demonstrated that powder particles made by this method are themselves spongy and very porous. It was found further that such an iron powder is completely unusable in any economical process, for example, because it has a very low fluidity.

Light weight iron powder made by the known reduction processes have these disadvantageous properties because of specific inherent relations that underlie the reduction of iron oxides and will be explained next. As the iron oxide is being reduced, the oxygen as produced and extracted diffuses through the still solid ore particles. The loss in mass causes formation of pores in these particles. The total volume of the pores thus produced can be calculated from the difference in density between the raw product (hematite) and the iron that results from the process. Accordingly, it was found that 1 cm$^3$ raw material (nonporous hematite particles) changed in that 53 % of that volume was occupied by pores. In other words, the particles which did not change in shape, were now constituted by 0.47 cm$^3$ metallic iron, the remainder volume was occupied by pores. The mechanism of extracting oxygen differs with the method and depends upon the ore type as well as on the conditions under which reduction is carried out (e.g. reduction temperature, composition of the reduction medium). Accordingly, the morphological structure of the iron as made may differ so that number, shape, size, and distribution of the pores in the reduced iron may vary greatly. Differences in morphological structure of the reduced iron particles are reflected in different properties of the powder as made; see, for example, "Bockstiegel, G., Int. Journ. of Powder Metallurgy 2 (4) 1966".

For example, if the oxide is reduced at a low temperature (e.g. 700° C) a powder is produced having, indeed, a low bulk density. However, the powder particles as made in that manner, have a very high microporosity which may even result in pyrophoric properties. In other words, the low bulk density is to some extent fictitious because it is not only the result of external (usual) voids between particles but also of micro-porosity of the particles themselves. Even those pores which are theoretically open are actually accessible only with difficulties due to labyrinth-like connections. Thus, these particular pores impede significantly the compacting of the powder material by a press. Moreover, these more or less closed pores are not available or to a small extent only to receive other substances for obtaining a compound material.

Another disadvantage of using low reduction temperatures is to be seen in that inherently long periods of times are needed to complete the process; quite frequently the long process time is coupled with a high consumption of reducing agents. Still further disadvantages are to be seen in that in some cases one produces iron particles, which are rather weak mechanically, so that the powder must be treated very gently. As was already mentioned above, known powder having low bulk density is not very fluid. However, all these disadvantages have been allowed for, if such a material had to be used for reasons of its desirable properties.

Iron powder having no or very few pores and, therefore, being free from the deficiencies outlined above have been made in the past only by atomizing molten iron by means of a pressurized fluid. The resulting, rather compact iron particles pack very tightly, and the powder has a high bulk density accordingly, i.e. in excess of 2.3 g/cm$^3$, see, for example, in Michalke, M. and W. Scholz "Die Erzeugung von Eisen- und Legierungspulvern durch Zerstaeuben von Schmelzen", 2nd Europ. Symposium on powder metallurgy, Stuttgart, May 8 to 10, 1968.

DESCRIPTION OF THE INVENTION

It is an object of the present invention to provide a method for making iron powder having a low bulk density, e.g. not more than about 1 g/cm$^3$ and being free from the deficiencies as outlined above as to both, method and resulting product.

It is a specific object of the present invention to provide a powder, in which the particles are at least substantially free from internal pores.

The invention is based on the recognition that the powder particles should have fiber-like, i.e. long and thin configuration, because such particles have a kind of bulky configuration, so that upon random positioning of each particle in relation to those of its environment a rather losse packing is inevitable. If the particles are, in fact, free from pores, additional material may be included in the powder without danger of retaining voids.

Powder made of elongated, fiber-like, non-porous particles can be expected to be highly resistive against mechanical wear. Moreover, the particles can be expected to intimately clamp each other, much more so than is possible among grain-like or globule-like particles with "point contacts" between them. Hence, the elongated particles should result in an iron powder having large green strength and high sintering strength for, possibly, considerably lower sintering temperatures than can normally be expected.

It is another object of the present invention to provide for a method which permits adjustment of the resulting bulk density within the range of about 0.5 to 1.2 g/cm$^3$, simply by adjusting process parameters. Another adjustable characteristics that is desirable here is the fluidity; the powder should be fluid inspite of the bulkiness of the elongated particles of which it consists.

In accordance with the preferred embodiment of the invention, it is suggested to provide fine grain iron-oxide in that, for example, waste and otherwise exhausted or used steel or iron pickling solution are subjected to spray-roasting or spray calcination. The iron-oxide is made available either as bulk-powder or at grainy consistency and in loose fill or as pellets. This material is reduced at a temperature from 800° to 1000° C in an atmosphere that consists of or includes CO, but is at least substantially free from $SO_2$. The reduction product is then cooled in a still reducing or inert atmosphere until e.g. reaching room temperature, and the cooled product is ground, i.e. the cake is at least broken up.

It is a surprising result that iron oxides made by spray calcination yield an iron powder, which, unlike powder reduced from iron oxides obtained otherwise, does not have porous particles, but non-porous elongated particles of fiber-like configuration. It was found that the $SO_2$ content of the reduction gas should not exceed 1 % in relation to the CO content, as a higher $SO_2$ content interfers with the formation of the fibers.

The tendency of the iron oxide made by spray calcination to yield fibers of the reduced iron depends to some extent on the material that was pickled, e.g. on the quality of the steel that was pickled. Also, the operation of the spray-roasting or calcination equipment has some influence on that tendency. In order to obtain some regulation here, it is suggested to use hydrogen during the reduction. Either one uses hydrogen together with CO, but not in excess of 20 % $H_2$. Alternatively, most of the oxide is reduced by CO alone and the final reduction is carried out by $H_2$. This way, one can more readily assure the subsequent formation of iron fibers. Alternatively or additionally, one can heat-treat the iron oxyde prior to reduction and at a temperature between 1000° to 1200°C in a neutral or even an oxidizing atmosphere (precalcination).

Generally speaking, oxidizing calcination enhances subsequently the fibrous consistency of the iron powder particles which, of course, means that the bulk density is lower. The presence of $H_2$ in and as reducing agent generally has a counteracting effect here, which is the reason for limiting its content in the reducing atmosphere. If the tendency to form fibers is reinforced by the said prior heat treatment, it was found that precalcination for 8 to 20 minutes at about 1100° C readily suffices.

The tendency to form fibers can also be enhanced by seeding the iron oxides with an additive. A seeding material which can be used with advantage is, for example, CaO at a ratio from 0.2 to 2 %. A higher content of such additives will not yield any significant improvement in the iron powder.

In practicing the invention, the CO-atmosphere may be produced in situ by adding e.g. a carbon carrier such as charcoal to the iron oxide to obtain the CO in a manner known per se. The reduction generally is carried out by passing the reducing gas over the iron oxide.

The limited use of hydrogen as reducing agent was already mentioned above. The method in accordance with the invention can be improved if the reduction is interrupted after about 80 % of the oxide-oxygen has been extracted. The remaining oxygen is reduced by adding continuing the reducing process in hydrogen. One should proceed in this manner if the danger exists that towards the end of the reduction carbon that is released e.g. from the CO atmosphere contaminates the iron powder. Completing the reduction in Hydrogen obviates that danger and, as stated, has little effect on the fiber structure of the particles, if used to a minor extent while, on the other hand, more extensive use of hydrogen impedes to some extent fiber formation which in turn is a parameter for control of the resulting bulk density.

The oxide used as raw material may contain chlorine and sulfates which could corrode the reduction vessel. Therefore, these contaminants should be removed by scrubbing the oxide in water and filtering prior to the reducing.

The bulk density of the iron powder as product may actually be too low for some uses. Therefore, one can grind the powder subsequently which is a convenient way of controlling the final bulk density. Thus, one should distinguish between grinding merely to break up the cake from the reducing chamber and further grinding to reduce particle size e.g. fiber length.

EXAMPLES

EXAMPLE 1

Pellets at a size somewhat in excess of 3.15 mm are made from iron oxide made by spray calcinating a pickling solution for steel. As per an analysis, the pellets consist of:

0.05 % $SiO_2$
0.2 % CaO
0.2 % MgO
0.2 % $Al_2O_3$
0.01 % $TiO_2$
0.1 % $Cr_2O_3$
0.27 % Mn
0.04 % P
0.06 % S
0.09 % $Na_2O$
0.01 % $K_2O$
0.02 % Ni
0.41 % FeO
95.8 % $Fe_2O_3$ whereby the iron content in the two oxides amounted to 67.4 % by weight.

1000 grams of such raw material were reduced in a rotating or revolving tube-like reduction vessel or chamber in the following manner. The oxide pellets was heated in $N_2$ up to 900° in 45 min., whereupon pure CO (no $SO_2$) was introduced for 180 min. and at 900° C. The amount of gas throughput was 1000 Nl per hour. Thereafter, the reduction product was cooled in $N_2$ and 685 g reduced iron cake could be removed from the chamber. The cake was then ground (broken up) in a toothed disk mill of the type traded under the name Condux. More than 95 % of the powder particles that resulted therefrom had a diameter smaller than 200 μ, and the powder had a bulk density of 0.53 g/cm³. The powder consistency was as follows:

98.6 % Fe (total) of which
  98.4 % was metallic iron and the remainder was contained in the 0.13 % FeO and 0.13 % Fe₂O₃.

* 1 Nl being 22.414 liters

Further analysis yielded 0.04 % P, 0.01 % S and 0.35 % C (all percentages by weight).

EXAMPLE 2

The raw material, quantity and equipment were the same as in example (1). Preparation was also similar except that heating in N₂ to 900°C took only 35 min. The following reduction lasted also 180 min. at a temperature of 900° C, but the gas used was 85 % CO and 15 % H₂ at less than 1 % SO₂. The gas throughput was 1000 Nl/h. The substance was subsequently cooled in N₂ and yielded 690 g, which was ground in the same kind of mill. In this case now 25 % of the powder particles were smaller than 200 μ and the powder had a somewhat higher bulk density of 0.95 g/cm³ due to the participation of hydrogen in the reducing process. Fluidity of the powder was determined as follows: 25 cm³ took 60 second to pass through a 2.5 mm funnel. The consistency of the powder was 98.0 % Fe (total)
97.8 % Fe (metallic)
0.10 % FeO
0.17 % Fe₂O₃
0.07 % P
0.01 % S
0.25 % C

EXAMPLE 3

The initial or starting material was a socalled Ruthneroxide at a consistency of 0.4 % SiO₂
0.05 % CaO
0.05 % MgO
0.1 % Al₂O₃
0.09 % CR₂O₃
0.50 % FeO
95.4 % Fe₂O₃
amounting to
67.2 % Fe
0.31 % Mn
0.11 % P
0.07 % S
0.03 % Na₂O
0.01 % K₂O
0.06 % Ni
0.04 % Mo
3.5 % Cl 1200 grams of this oxide material was scrubbed to remove the Cl in a filter pan made of porcellan with perforated, sieve-like bottom and black ribbon filter paper. 800 ml of cold water was used for scrubbing. After each of four sequential scrubbings the initial chlorine content of 3.5 % was respectively reduced in steps to 3.05; 0.5; 0.16 and 0.09 %. The filter cake was broken into about fist size pieces and dried. These pieces constituted the charge for the subsequent reducing process. Beginning with 1000 g of the afore-mentioned pieces and using the same kind of reducing equipment as in the preceding examples, the charge was heated in N₂ to 900° C in 40 min. The reduction was carried out in two steps. The first step lasted 120 min. at 900° C and a gas flow or 1800 Nl/h was used in which the gas was a mixture of 40 % CO and 60 % N₂. The second step lasted 60 min. and a gas flow at the rate of 2500 Nl/h was used having consistency of 60 % H₂ and 40 % N₂. Thereafter, the reduced substance was cooled in N₂ and 620 g cake was extracted and ground in the same kind of mill mentioned above. The powder had a bulk density of 1.18 g/cm³ and 60 % of the particles were smaller than 200 μ. The powder had a consistency of 95.4 % Fe (total)
95.0 % Fe (metallic)
0.20 % FeO
0.30 % Fe₂O₃
0.05 % Na₂O
0.02 K₂O
0.14 % C

EXAMPLE 4

The raw material and the Cl removal was the same as in example 3. 1000 g of filter cake pieces were then calcinated in air for 18 min. at 1100° C. The equipment, the heating and the reduction followed also the procedure under example 3 and yielded 640 g. The cake was ground in the same kind of mill and now 80 % of the powder particles were smaller than 200 μ and the bulk density was 0.78 g/cm³. It can thus be seen that the precalcination of the oxide significantly counteracted the effect of the hydrogen as compared with example 3, so that the bulk density was quite low. The powder had a consistency of 95.7 % Fe (total)
95.3 % Fe (metallic)
0.15 % FeO
0.40 % Fe₂O₃
0.05 % K₂O
0.02 % Na₂O
0.08 % C

EXAMPLE 5

This example is a comparative test to example 3. Preparation (scrubbing) equipment and reduction were carried out in exactly the same manner except that 2 % CaO was added to the 1000 g scrubbed, dried and broken up charge, but prior to heating and reduction. The charge was not precalcinated as in example 4.

This modification yielded 630 g (vs. 620 g) and after grinding in the same fashion a powder of 0.74 g/cm² bulk density (vs. 1.18 g/cm³) was produced; 75 % of the particles were larger than 200 μ. Thus, the adding of CaO had quite a similar effect as the precalcination as far as lowering the bulk density is concerned. The composition of the powder was 91.5 % Fe (total)
90.1 % Fe (metallic)
0.86 % FeO
1.04 % Fe₂O₃
2.9 % CaO

EXAMPLE 6

The raw material for this example was powdery spray calcinated oxide having the following consistency and composition:

0.2 % SiO₂
0.1 % CaO
0.1 % MgO
0.1 % Al₂O₃
0.13 % FeO 98.0 % $Fe_2O_3$
amounting to
68.6 % Fe
0.40 % Cl
0.00 % P
0.05 % S
0.13 $Na_2O$
0.01 % $K_2O$ 2000 gram of this material was mixed with 300 g ground charcoal and a 50 mm thick fill was deposited on a flat metal pan and annealed in $N_2$ for 3 hours at 900° C in a chamber furnace. During this heat process CO was formed, and the iron oxide was reduced to a substantial degree. Subsequently, the treatment was continued at the same temperature, but in $H_2$ and for 2 hours with a through-flow of 2500 N1/h reducing gas. The material was then cooled in $N_2$. The result was a felt-like cake of iron fibers, which was ground (broken up) in a Condux mill, and particles in excess of 200 $\mu$ were eliminated by sieving. The resulting iron powder had the following consistency and composition:

0.26 % FeO
0.14 % $FE_2O_3$
0.28 % C
97.0 % Fe (total)
96.7 % Fe (metallic)

The powder had a bulk density of 0.98 $g/cm^3$. The fluidity was ascertained in that 50 $cm^3$ powder volume took 95 seconds to pass through a 3 mm funnel.

EXAMPLE 7

The raw material was the same as in example 6. 2000 g of that material was placed in 50 mm thick fill on a flat metal pan, which in turn was placed into a chamber furnace for reduction at 900° C. Again, a step process was used in that the first step took 90 min. for reduction in CO at a through-flow of 3000 N1/h followed by 60 min. reduction in $H_2$ with the same through-flow of 3000 N1/h. Cooling again was carried out in a $N_2$ atmosphere. The resulting felt-like cake consisted completely of very fine iron fibers; the cake was broken up by grounding in a Condux mill, and particles with a diameter above 200 $\mu$ were removed by sieving. The resulting powder had the following composition:

Fe (total) 99.1 %
Fe (metallic) 98.8 %
FeO 0.28 %
$Fe_2O_3$ 0.11 %
S 0.01 %
C 0.04 %
Cl 0.00 %

The powder had a bulk density of 0.65 $g/cm^3$ and the green strength of a standard rod had 10 kilogram force (about 100 Newtons) per square cm. The sinter strength was about 22.7 kilogram force/$mm^2$ (about 22.5 Newtons/$mm^2$) for 1100° C — 1 h in $H_2$. At a sintering temperature of 700° C the strength was still 19.0 kp/$mm^2$, i.e. a little under 190 Newtons/$mm^2$, (1 Newton being $10^5$ dynes or 0.10197 kg weight).

The following two examples are of a supplementing nature to demonstrate in two specific instances how a very low bulk density can effectively be increased. The method used in these examples are applicable to all preceding examples if an increase in bulk density is desired.

EXAMPLE 8

A fibrous iron powder with a bulk density of 0.46 $g/cm^3$ was stepwise ground in an oscillating disk mill (ball mill) with two hard rubber disks for grinding, each disk weighing about 7 g. About 40 $cm^3$ of such powder was ground; the vessel of the mill had 66 mm diameter. The bulk density changed as follows:

No grinding 0.46 $g/cm^2$
after 10 seconds 0.67 $g/cm^3$
after 20 seconds 0.73 $g/cm^3$
after 60 seconds 0.87 $g/cm^3$
after 320 seconds 1.12 $g/cm^3$
after 960 seconds 1.27 $g/cm^3$

EXAMPLE 9

100 grams of a fibrous iron powder with a bulk density of 0.48 $g/cm^3$ was stepwise ground in a condux mill, which was firmly closed. Each step lasted about 20 seconds. The change in density ran as follows:

No grinding 0.48 $g/cm^3$
1. grinding 0.54 $g/cm^3$
2. grinding 0.58 $g/cm^3$
3. grinding 0.62 $g/cm^3$
4. grinding 0.66 $g/cm^3$
5. grinding 0.69 $g/cm^3$
6. grinding 0.70 $g/cm^3$ It can readily be seen that the bulk density of the iron powder as made can be post-treated (ground) to almost any desired degree to increase the density to an exact, predetermined value.

The iron powder made in accordance with the invention can be particularly used as friction and brakelining. As was stated above, such linings require interlinked metal skeleton-like bodies with large, extensive and accessible voids and spaces to be filled with other material, such as graphite. The fibrous powder made as per this invention is very suitable for this purpose. Other uses of such powder are the following:

1. binding matrix for sealing in rotary engines;
2. voluminous sinter bodies of a density of about 2 grams/$cm^3$ with large inner surface for chemical catalysts;
3. use as filler in plastics;
4. conduction bridges in spark plugs;
5. shielding structures for electrical or magnetic fields;
6. sound and/or heat insulation at high temperatures, particularly when plastics cannot be used;
7. use in filters and fleeces;
8. slide and glide elements with embedded graphite.

As is known generally, the conventional iron powders have to be sintered in the gamma-region of the iron in order to obtain adequate support strength, whereby the graphite is solved. If one uses such extremely light powder, as made in accordance with the present invention, adequate strength is still obtained even if a sinter temperature in the alpha region is used, so that no graphite solution appears.

The invention is not limited to the embodiments to the embodiments described above, but all changes and modifications thereof not constituting departures from the spirit and scope of the invention are intended to be included.

We claim:

1. Method of making an iron powder in which the particles have a fiber-like configuration, comprising the steps of providing grain iron oxide particles by spray calcinating a pickling solution that was used for pickling iron or steel;

reducing the iron oxide at a temperature in the range from 800° to 1000° C in an atmosphere which contains CO, but is substantially free from $SO_3$;

cooling the reduced product in a reducing or inert atmosphere; and grinding the cooled product.

2. Method as in claim 1, wherein the reducing atmosphere includes at most 20 % hydrogen.

3. Method as in claim 1, wherein the reducing is carried out in steps in that most of the oxide is reduced in the CO-containing atmosphere without $H_2$ being present followed by reducing the remaining oxide in a $H_2$ containing atmosphere.

4. Method as in claim 3, wherein the change in atmosphere is provided after about 80 % reduction of the iron oxide.

5. Method as in claim 1, wherein the reducing step is preceded by a heat treatment in a neutral or oxidizing atmosphere to enhance formation of iron fibers.

6. Method as in claim 5, wherein the heat treatment is carried out at 1000° to 1200° C.

7. Method as in claim 1 and including mixing the iron oxide with an additive for enhancing formation or iron fibers.

8. Method as in claim 7 and wherein the additive is CaO, added at an amount of 0.2 to 2 %.

9. Method as in claim 1, wherein the CO is produced in situ during reduction.

10. Method as in claim 9, and including the mixing of a carbon carrier with the iron oxide to obtain CO production during heating.

11. Method as in claim 10, wherein charcoal is used to obtain in situ CO production.

12. Method as in claim 1, wherein the reducing step is preceded by scrubbing and filtering the oxide.

13. Method as in claim 1 and including the step of additionally grinding the powder to control the resulting bulk density.

14. Method of making an iron powder, in which the particles have fiber-like configuration, comprising the steps of providing a grainy iron oxide by spray calcinating a pickling solution that was used for pickling iron or steel;

reducing the iron oxide at a temperature in the range from 800° to 1000° in CO, but using hydrogen for reducing a relatively small portion of the oxide whereby hydrogen is used at least in parts in the last phases of reduction;

enhancing the formation of iron fibers pursuant to the reduction, during or prior to the reduction;

cooling the reduced iron fiber cake; and breaking the cake up into fibers.

15. Method as in claim 14, wherein the enhancing step includes calcination of the oxide prior to said reducing step.

16. Method as in claim 14, wherein the enhancing step includes adding 0.2 to 2 % CaO to the oxide.

17. Method as in claim 14, wherein the reducing step is carried out in two steps, the first step being a reduction stop of the oxide in CO, the second, subsequent step being a reduction stop of the oxide in hydrogen.

* * * * *